(12) United States Patent
Klasén

(10) Patent No.: US 10,066,930 B2
(45) Date of Patent: Sep. 4, 2018

(54) INTELLIGENT BOLT AND SYSTEM THEREFOR

(71) Applicant: Strain Labs AB, Lomma (SE)

(72) Inventor: Lena Widin Klasén, Vadstena (SE)

( * ) Notice: Subject to any disclaimer, the term of this patent is extended or adjusted under 35 U.S.C. 154(b) by 41 days.

(21) Appl. No.: 15/032,740

(22) PCT Filed: Apr. 2, 2015

(86) PCT No.: PCT/EP2015/057369
§ 371 (c)(1),
(2) Date: Apr. 28, 2016

(87) PCT Pub. No.: WO2015/150544
PCT Pub. Date: Oct. 8, 2015

(65) Prior Publication Data
US 2017/0167857 A1    Jun. 15, 2017

(30) Foreign Application Priority Data

Apr. 4, 2014 (SE) ...................................... 1450415

(51) Int. Cl.
*G01B 11/16* (2006.01)
*G01L 5/24* (2006.01)
*F16B 31/02* (2006.01)
*G01S 17/06* (2006.01)

(52) U.S. Cl.
CPC ............ *G01B 11/161* (2013.01); *F16B 31/02* (2013.01); *G01L 5/24* (2013.01); *G01S 17/06* (2013.01)

(58) Field of Classification Search
CPC ......... F16B 31/02; G01B 11/161; G01L 5/24; G01S 17/06
See application file for complete search history.

(56) References Cited

U.S. PATENT DOCUMENTS

| | | | | |
|---|---|---|---|---|
| 5,945,665 A | * | 8/1999 | Hay | G01B 11/18 250/227.14 |
| 6,351,997 B1 | | 3/2002 | Löffler | |
| 2007/0144267 A1 | * | 6/2007 | Sato | G01L 5/24 73/761 |
| 2010/0132477 A1 | * | 6/2010 | Ohl | G01B 11/16 73/800 |
| 2010/0329602 A1 | * | 12/2010 | Shah | G01D 5/35303 385/13 |
| 2013/0068031 A1 | * | 3/2013 | Mekid | F16B 31/02 73/761 |
| 2013/0088069 A1 | | 4/2013 | Dooner | |

FOREIGN PATENT DOCUMENTS

| | | |
|---|---|---|
| CN | 1950617 | 4/2007 |
| FR | 2916838 A1 | 12/2008 |
| WO | 98/35791 A1 | 8/1998 |
| WO | 2011/090539 A1 | 7/2011 |

OTHER PUBLICATIONS

International Search Report and Written Opinion received for International Patent Application No. PCT/EP2015/057369, dated Dec. 14, 2015, 23 pages.

* cited by examiner

*Primary Examiner* — Francis Gray

(57) ABSTRACT

A bolt (100) which is deformed when subjected to strain includes a cavity (104), intelligence and means (105) for determining strain and to alert at specific values.

19 Claims, 5 Drawing Sheets

INTELLIGENT BOLT AND SYSTEM THEREFOR

TECHNICAL FIELD

The present invention concerns measuring strain of mechanical members, such as fastening means, for instance bolts.

BACKGROUND

It is known from prior art, for example from U.S. Pat. No. 4,553,124, to install strain gauges inside bolts in order to sense strain. However, these known strain gauges are complicated and thereby expensive. Another drawback is that they are temperature dependant.

JP-A-11183280 describes a bolt fastening or tightening method in which the elongation of the bolt is being measured while tightening of the bolt is performed. The fastening or tightening operation is terminated when the elongation reaches a predetermined value. The method used to measure the elongation includes a step of operating a laser. In this known method, the elongation of the bolt is monitored when the bolt is being fastened/tightened, but when the tightening is terminated no further information of the elongation is available. Thus, it is impossible to obtain information if the bolt is loosened.

Further background art is disclosed in US2010/0050778 and US2007/0204699.

From the above it is understood that there is room for improvements.

SUMMARY

An object of the present invention is to increase security and to provide a new type of strain measuring arrangement with communication means and allowing for intelligent analysis, which is improved over prior art and which eliminates or at least mitigates the drawbacks discussed above.

This object has now been achieved by the technique defined in the appended independent claims, and with preferred embodiments set forth in the dependent claims.

In a first aspect of the invention, there is provided a mechanical member having a portion which is deformed, i.e. elongated, when subjected to strain. The portion comprises a cavity. The member further comprises an optical unit which is configured to emit light into the cavity. The optical unit is also configured to detect reflected light. The member further comprises a control unit which is connected to the optical unit. The control unit is configured to determine the signal response features caused by the emitted light that has travelled from the optical unit into the cavity, has been reflected, and has travelled back to the optical unit. Furthermore, the control unit is configured to determine physical deformation of the portion of the mechanical member from the determined signal response features, in order to determine strain data. The member further comprises a communication unit connected to the control unit and configured to communicate strain data of the mechanical member to an external device. It is advantageous to determine the physical deformation of the mechanical member since it may be used to determine the strain of the member. It is also advantageous that the member comprises a communication unit, which makes it possible for the member to send and receive data, for example strain data.

The control unit may be configured to determine physical deformation by the time-of-flight method or by interferometry. It is advantageous to determine a physical deformation of the mechanical member since it may be used to determine the strain of the member.

The optical unit may comprise a light emitter and a light detector in order to be able to both send out and to receive light. It may also comprise reflectors, beam splitters and/or other optical components. Further, the control unit may be a microcontroller which may be configured to control the light emitter, among other components. It is an advantage to have a control unit in order to be able to control the other components comprised in the mechanical member.

Preferably, the optical unit comprises a laser. It is advantageous to use a laser as the optical unit since it emits light coherently. It is thus possible to illuminate the bottom of the cavity without illuminating the walls, which would result in an incorrect calculation of strain data.

The mechanical member may comprise a charging unit configured to harvest energy from the surrounding environment. The mechanical member may also comprise an energy storing unit configured to store the energy harvested by the charging unit and to provide energy to the control unit and to the communication unit. The energy storing unit may comprise an accumulator, preferably a chargeable battery. The mechanical member is likely to be installed remotely and inaccessibly. It is therefore preferred that the member is able to extract and store energy, to be able to supply both the control unit and the communication unit, and to not be dependent on a certain battery lifetime.

In another embodiment, the member comprises a memory unit configured to store for example pre-set fabrication data, determined strain data and/or processed strain data or elongation data. Hereby various data can be stored waiting to be further communicated or for future purposes.

In an embodiment, the communication unit is wireless. This is preferred when the mechanical member is installed at a remote location, since no technician needs to travel to the assembly place to collect stored data from the mechanical member. In another embodiment, the mechanical member could use a fixed link. This is preferred when the mechanical member is placed at a location where such infrastructure already exists.

In one embodiment, the mechanical member comprises a supporting sensor unit. The supporting sensor unit may provide the control unit with additional useful input data to be used when determining the strain of the member. The supporting sensors may be more than one, and the type of sensors used may be a combination of appropriate sensors for each particular field of application of the mechanical member.

One example of a supporting sensor is a temperature sensor which is beneficial if the mechanical member is positioned in an environment with high or low temperatures which may affect the strain determination.

Another example of a supporting sensor is a positioning device which is beneficial if the mechanical member is installed in a vehicle. It is then possible to determine where the member is located and, as an example, at which of the vehicle's planned stops the member needs to be tightened.

Yet another example of a supporting sensor is a moist sensor which is beneficial if the mechanical member is positioned in an environment with high or low moisture which may affect the strain determination, or induce corrosion.

In a preferred embodiment, the mechanical member is included in a network which also comprises central software configured to monitor strain data of all members comprised in the network. The central software is also configured to automatically report normal function, malfunction or deviations. The mechanical member is configured to communicate with other corresponding members comprised in the network. It is beneficial to have a network of members in order to share or forward information between, or to, members.

The mechanical member may be a fastening element, such as a bolt, a screw or a rivet, configured to tighten or clamp two parts together. With the previously and hereafter described characteristics it is possible to estimate if a fastening element is loosening and needs to be tightened, and if so, when it is crucial for this maintenance to be performed. It is also possible to avoid joint failure due to fatigue, separation of clamped parts or movement between clamped parts.

In a preferred embodiment, the cavity in the mechanical member is an elongate bore. An elongate bore is advantageous since it allows a light pulse train to travel a certain distance before it is reflected at the bottom of the bore and starts to travel back. A longer bore yields better accuracy of the measurements and calculations.

In one embodiment, the cavity comprises an optical fiber. An advantage with this structure is that the fiber works as a fuse. If the member for any reason is elongated more than the optical fiber can stretch, it will break, and it will be impossible to perform a measurement, thus the member can report that an error has occurred. Further, it is possible to program the sensor to warn if the member is overloaded even if the fiber does not break.

In a second aspect of the invention, there is provided a method for measuring strain of a mechanical member, having a cavity. The method comprises the steps of emitting a light pulse train from an optical unit into the cavity, detecting a reflected light pulse train, by the optical unit, determining the signal response features caused by the emitted light that has travelled from the optical unit into the cavity, has been reflected, and has travelled back to the optical unit, determining physical deformation of the mechanical member from the determined signal response features in order to determine strain data, and communicating the determined strain data to an external device.

In one embodiment the physical deformation is determined by the time-of-flight method or by interferometry.

In one embodiment, the strain data is communicated to a handheld device. This is advantageous when the mechanical member is accessibly placed and when an operator onsite for some reason is preferred. It is also advantageous during assembling.

In another embodiment the strain data is communicated via a wireless communication system. This communication method is preferred when the member is inaccessibly placed or when an onsite operator not is preferred.

In yet another embodiment, the strain data is communicated in a network of mechanical members. This is advantageous when the members are placed inaccessibly and where wireless communication possibilities directly to an external device is missing or when it is desirable to send data from several members as one package.

In a third aspect of the invention, there is provided a system which comprises a number of mechanical members as described above. The system further comprises central software and infrastructure which is configured to monitor strain data of all mechanical members comprised in the system, and also to report normal function, malfunction or deviations.

In one embodiment, information can be read from/written to the mechanical members comprised in the system. For example, if the pre-set fabrication data turns out to be wrong, new and correct data may then be uploaded to all members comprised in the system.

In a fourth aspect of the invention, there is provided a structural element, such as an aircraft wing, comprising a number of mechanical members as described above. The members comprised in the structural element may be connected in a network. An advantage of having members comprised in a structural element is that the whole element may be fabricated with the members and delivered, instead of delivering the structure in parts for assembly onsite.

In one aspect an assembly is provided which comprises a mechanical member which is deformed when subjected to strain. The member comprises a cavity. The system further comprises an optical unit configured to emit light into said cavity and to detect reflected light. It further comprises a control unit connected to the optical unit and configured to determine signal response features caused by the emitted light travelling from the optical unit into the cavity, where it is reflected, and travels back to the optical unit. The control unit is further configured to determine physical deformation of the mechanical member from the signal response features to determine strain data from the physical deformation. The system further comprises a communication unit connected to the control unit and configured to communicate strain data of the mechanical member to an external device.

BRIEF DESCRIPTION OF THE DRAWINGS

Embodiments of the invention will be described in the following; references being made to the appended diagrammatical drawings which illustrate non-limiting examples of how the inventive concept can be reduced into practice.

DETAILED DESCRIPTION

Certain embodiments will now be described more fully hereinafter with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
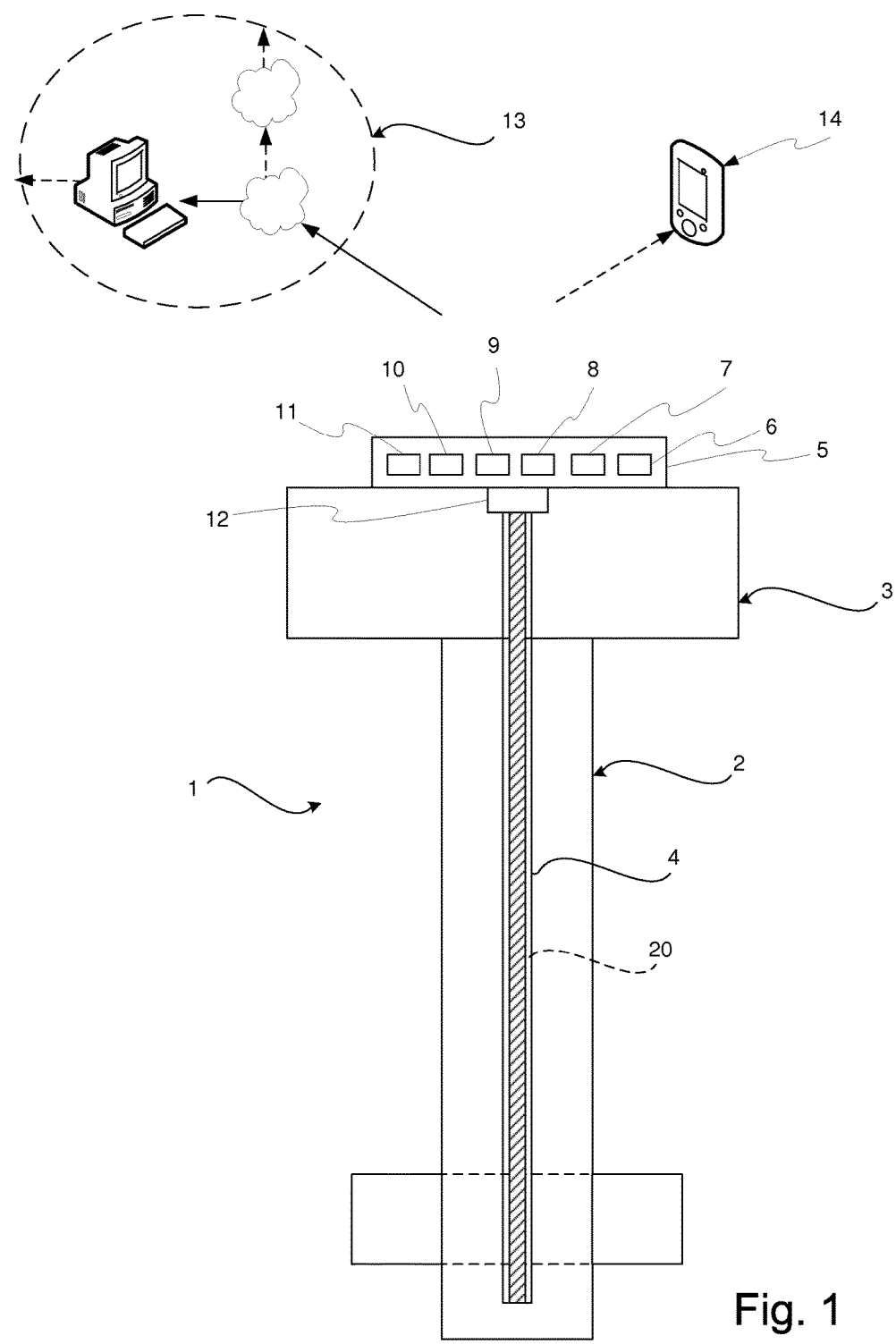
FIG. 1 is a sectional view of a bolt according to one embodiment.

With reference to FIG. 1 a mechanical member, or assembly, in the shape of an intelligent bolt 1 is schematically shown in cross section. The bolt 1 has a shaft 2 and a head 3 with an elongate bore or cavity 4 extending from the head 3 of the bolt 1 into the shaft 2. The bore 4 is preferably made as long and narrow as possible, while still retaining the strength of the bolt 1. The bore 4 is ended with a bottom. Preferably the cross section of the bore 4 is cylindrical. The diameter of the bore 4 is preferably as narrow as possible, ranging from for instance 0.1 µm to 1 cm.

The bolt 1 has an upper portion 5 accommodating a control unit 6, a memory unit 7, a charging unit 8, an energy storing unit 9, a communication unit 10, a supporting sensor unit 11 and an optical unit 12. In another embodiment the components 6-12 could just as well be mounted inside the head 3 of the bolt 1 or they could in any other way be connected to the bolt 1. The bolt 1 could also include another set of components, depending on the intended use of the bolt 1. The upper portion 5 is hereafter also referred to as an electronic package.

The control unit 6 controls the optical unit 12, the memory unit 7, the communication unit 10 and the supporting sensor unit 11. It is implemented using suitable control unit technology, such as, but not limited by; a microcontroller, a CPU, a microchip or the like. The control unit 6 is preferably implemented by RFID technology, and it is preferably small in size, for instance about 2×3 mm.

The optical unit 12 is configured to send out a light pulse train into the bore 4 of the bolt 1. It is preferably a light emitting unit and more preferably a laser, but a diode or any other suitable light source can be used. The optical unit 12 also comprises a light detector configured to detect reflected light.

The charging unit 8 includes an energy harvesting element which comprises any suitable components to harvest energy from the surrounding environment, for example, but not limited by, from external strain on the bolt, solar power, thermal energy, wind energy, salinity gradients, or kinetic energy. The charging unit 8 is configured to supply the energy storing unit 9 with power.

Other alternatives of energy harvesting are charging with a photo sensor, which transforms sunlight to energy or vibration energy harvesting.

A further option is charging by induction. A galvanically separated charging coil (not shown) is then placed on top of the head of the bolt 1 in which the electronic package is provided. The coil transfers energy by induction to the energy storing unit.

The energy storing unit 9 comprises a battery (not shown) for storing power. The bolt 1 could also be connected to the mains, or it could use any combination thereof. The energy storing unit 9 is configured to supply for example the control unit 6 with power.

The communication unit 10 operates via a wireless connection, wired interface or any combination thereof. The wireless connection could use any wireless transmission techniques, for example, but not limited by; WLAN, IR, Bluetooth®, radio, sonic, electromagnetic induction. The communication unit 10 is preferably implemented using Bluetooth®-technology and configured to communicate determined strain data to for example a handheld device 14 or central software 13 comprised in a network.

The memory unit 7 is implemented by means of memory technology, such as, but not limited by, ROM, RAM, SRAM, DRAM, CMOS, FLASH, DDR, SDRAM or the like. This unit 7 is configured to store the determined strain data, and/or preset fabrication data.

The supporting sensor unit 11 could for example be a temperature or a moist sensor, a positioning device or any other sensor that could supply the measurements with relevant input data. This unit 11 could comprise a number of sensors/devices for measuring different variables, such as moist and temperature.

In most embodiments the bolt 1 is programmed to log and report when the strain is sufficient to maintain the specific tension of the bolt 1. This could for example be obtained by a green light visible on the bolt itself (not shown). In most embodiments factory settings of the preferred strain boundaries are stored in the memory unit 7. The factory settings could comprise, but are not limited to, manufacturer name, batch number, unique bolt ID, batch date and time, strain window, name of assembler, torque used, ambient temperature, ambient moisture, strain after assembly, date of assembly, deviation over time in a database, and/or a maintenance alert.

In one embodiment the bolt 1 needs to be calibrated. If the bolt 1 is to be placed in a location with harsh weather conditions, for example with low/high temperatures, it is preferred to take that into account when determining strain data. The calibration could be a process calibration, performed at the factory and/or a calibration onsite. The factory calibration may for example take into account which materials the bolt will be tightening and the manufacturing batch.

One embodiment is focused on basic strain detection. It is possible to use for example a handheld device 14 to retrieve strain data from the bolt 1 in order to determine if strain is in range of the preset boundary values. This is done via the control unit 6 which receives the strain value from the memory unit 7, and communicates the strain value to the handheld device 14 via the communication unit 10. The bolt 1 is based on a self-charging system where an external communication device is used to ask the bolt 1 for its status. In this embodiment the bolt 1 is preferably equipped with a control unit 6, a communication unit 10, an energy storing unit 9 and a charging unit 8. The external communication device may be a handheld device 14. The bolt 1 checks if strain is in range, and if so, indicates adequate tightening.

In another embodiment the bolt 1 is part of an automatic system. Besides the charging unit 8 the bolt 1 of this embodiment comprises a wireless communication unit 10. The bolt 1 operates according to the principle that it is in an idle mode for a certain, adjustable length of time, which may depend on the battery level, wakes up, determines strain status, communicates determined strain status, and falls back to sleep. It is also possible to communicate with the bolt 1 via a communication device, which may be a handheld communication device. After assembly and indication of adequate strain it is possible to load data, for example fabrication boundary values, via the communication device and upload to the bolt's memory unit 7. When done, there could be an indication that the information has been received and stored. Indication of strain can be manually downloaded from the bolt 1 by means of the communication device. It can also be performed automatically by that the bolt checks if the strain is within range, indicates adequate tightening, and transmits information on demand, for example determined strain data.

In yet another embodiment the bolt 1 has knowledge about strain, by storing determined strain data in the memory unit 7 together with fabrication data, and it can remember deviation, also stored in the memory unit 7. An alarm may be sent out when the strain is descending/exceeding a threshold value. The bolt 1 is comprised in a network or system of bolts. The bolts 1 comprised in the system are monitoring strain with a frequency interval of between once every second to once every year, and can automatically report normal function, deviations and malfunction and also determine the time to a potential maintenance. The system further comprises central software and infrastructure 13. After assembly and indication of accurate strain it is possible to address the bolt 1 from a computer. It is also possible to write/read information to/from the bolt 1. From the central software it is possible to administrate the bolts 1 and to get an overview of the status for all bolts connected to the system. The bolt 1 determines if strain is in range, indicates adequate tightening or deviation/malfunction, transmits information on demand or at regular time intervals and is part of an intelligent system with log and memory.

The strain data, measured from the elongation of the bolt 1 may be communicated in any combination of above mentioned ways of communication. For example, strain data can be drawn from the bolt 1 with a handheld device 14 during assembly and during operation data can be sent between different members to one final bolt 1 which either forwards the data via wireless communication or stores the data until an operator extracts it with the handheld device 14.

In the embodiment, of FIG. 1 an optional optical fiber 20 is inserted in the bore 4 of the bolt 1, to lead the light emitted from the optical unit 12. The principal measurement approach in this embodiment is to send a light pulse train down into the bore of the bolt 1, through the optical fiber 20. The pulse train will travel through the fiber 20 arranged in the bore 4, be reflected in a bottom wall of the bore 1, and travel back through the fiber 20 arranged in the bore 4, to the detector of the optical unit 12. The control unit 6 determines the time this took, and determines the strain data by the time-of-flight method. Additionally, the optical fiber 20 could also work as a fuse or safety control; the fiber 20 is very fragile when exposed to strain in the longitudinal direction. Thus, when the bolt 1 is subject to an excessive strain, the optical fiber 20 will break and thus the strain measurement will not work anymore. This will be an indication of that something has gone wrong.

In the embodiment of FIG. 1 the control unit 6 determines signal response features of the bolt 1, in order to determine a physical deformation, e.g. elongation, by the method time-of-flight. This method is based on the principle of measuring the time it takes for a light pulse train, comprising one single light pulse, to travel from the optical unit 12 to the bottom of the cavity 4 where it is reflected and to travel back to the optical unit. The method time-of-flight can be used both with and without an optical fiber 20 in the cavity.

In another embodiment the control unit 6 determines signal response features of the bolt 1, in order to determine a physical deformation, e.g. elongation, by free-space optical communication, FSO. Free-space optical communication is a technique meaning that the cavity 4 is used in the same way as the earlier described optical fiber 20, but without the fiber 20.

In yet another embodiment the control unit 6 determines signal response features of the bolt 1, in order to determine a physical deformation, e.g. elongation, by interferometry, preferably optical interferometry. Interferometry is a measurement method in which waves are superimposed in order to extract information about the waves.

The physical deformation, e.g. elongation, in the embodiments above is strain in the longitudinal direction, but it could also be other physical deformations such as for example torsion or rupture caused by an external force. The above measurement methods may also be used for strain control, that is, the method is used to detect deviations or malfunction, as for example torque, disturbances or incorrect outcomes.

Figure 2:
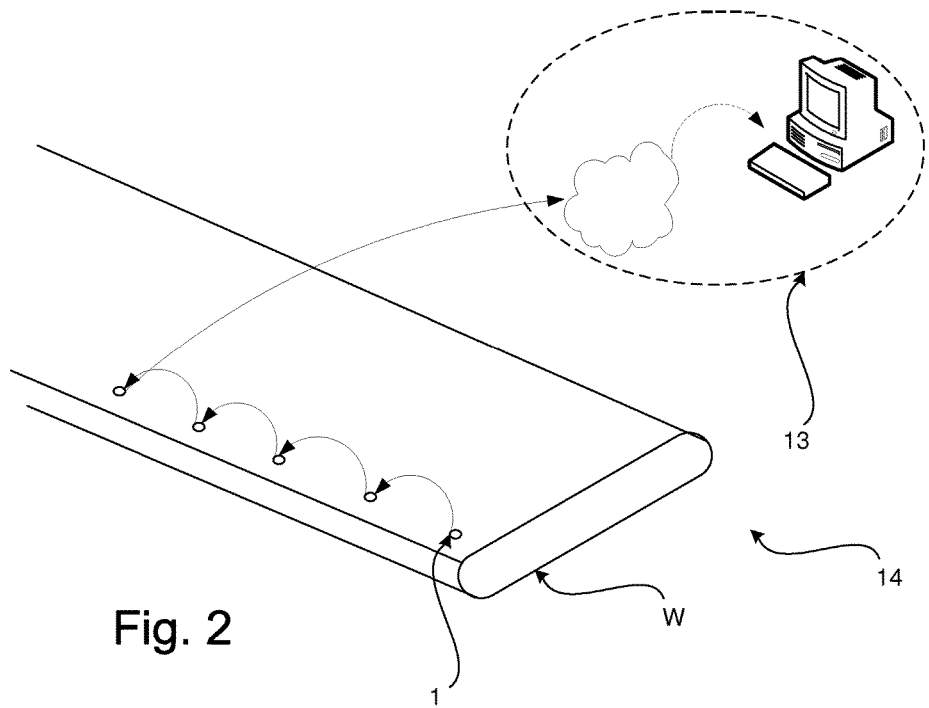
FIG. 2 shows a number of bolts comprised in an aircraft wing according to one embodiment of the invention.

With reference to FIG. 2 a system 14 of intelligent bolts 1 mounted to a structural element, here embodied as an aircraft wing W, is shown. The system further comprises central software and infrastructure 13. Hence, the bolts 1 comprised in the system 14 are monitoring strain with a frequency interval of for instance between once every second to once every year, by one of the above measurement methods. The bolts 1 are communicating between each other, with one bolt 1 receiving data from all the other bolts 1. The bolt 1 that received the data from all the other bolts 1 sends the information collected from all bolts 1 comprised in the system to the central software 13. This particular procedure is beneficial where no wireless network connection is available. One example could be bolts 1 installed along a railway tunnel, where one bolt communicates with the next, and so on, for example via Bluetooth®, until the data reach a bolt outside of the tunnel, which can then use a wireless network communication to transmit all data to the central software 13.

Figure 3:
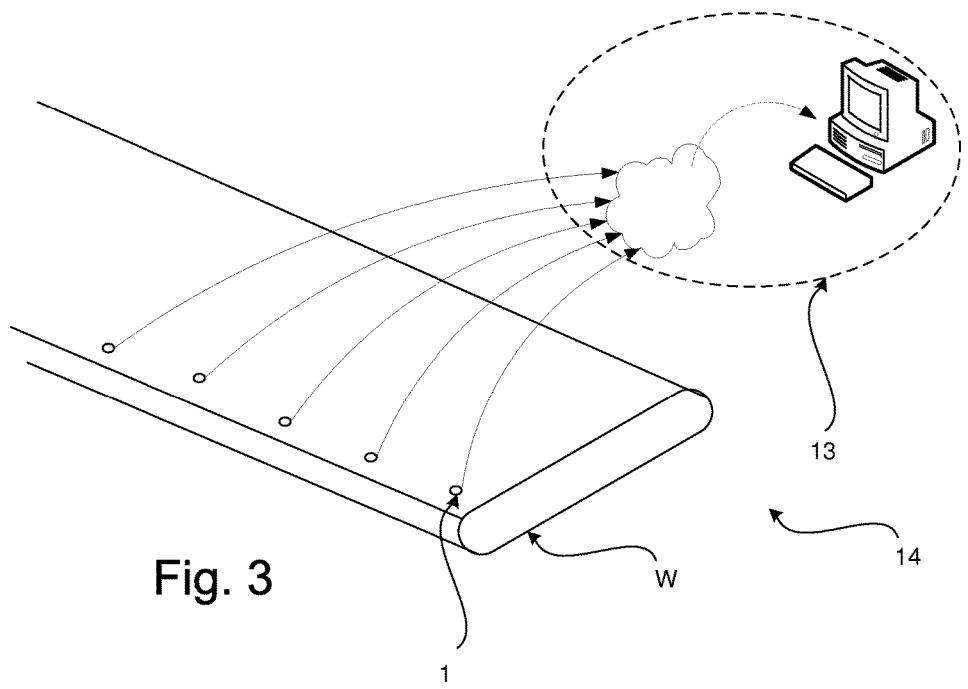
FIG. 3 shows a number of bolts comprised in an aircraft wing according to another embodiment of the invention.

In FIG. 3 a similar structure as in FIG. 2 is shown, with a system 14 of intelligent bolts 1 fastened to an aircraft wing W. The system 14 further comprises central software and infrastructure 13. The bolts 1 comprised in the system 14 are monitoring strain frequently but in this embodiment each intelligent bolt 1 communicates directly with the central software 13.

Figure 4:
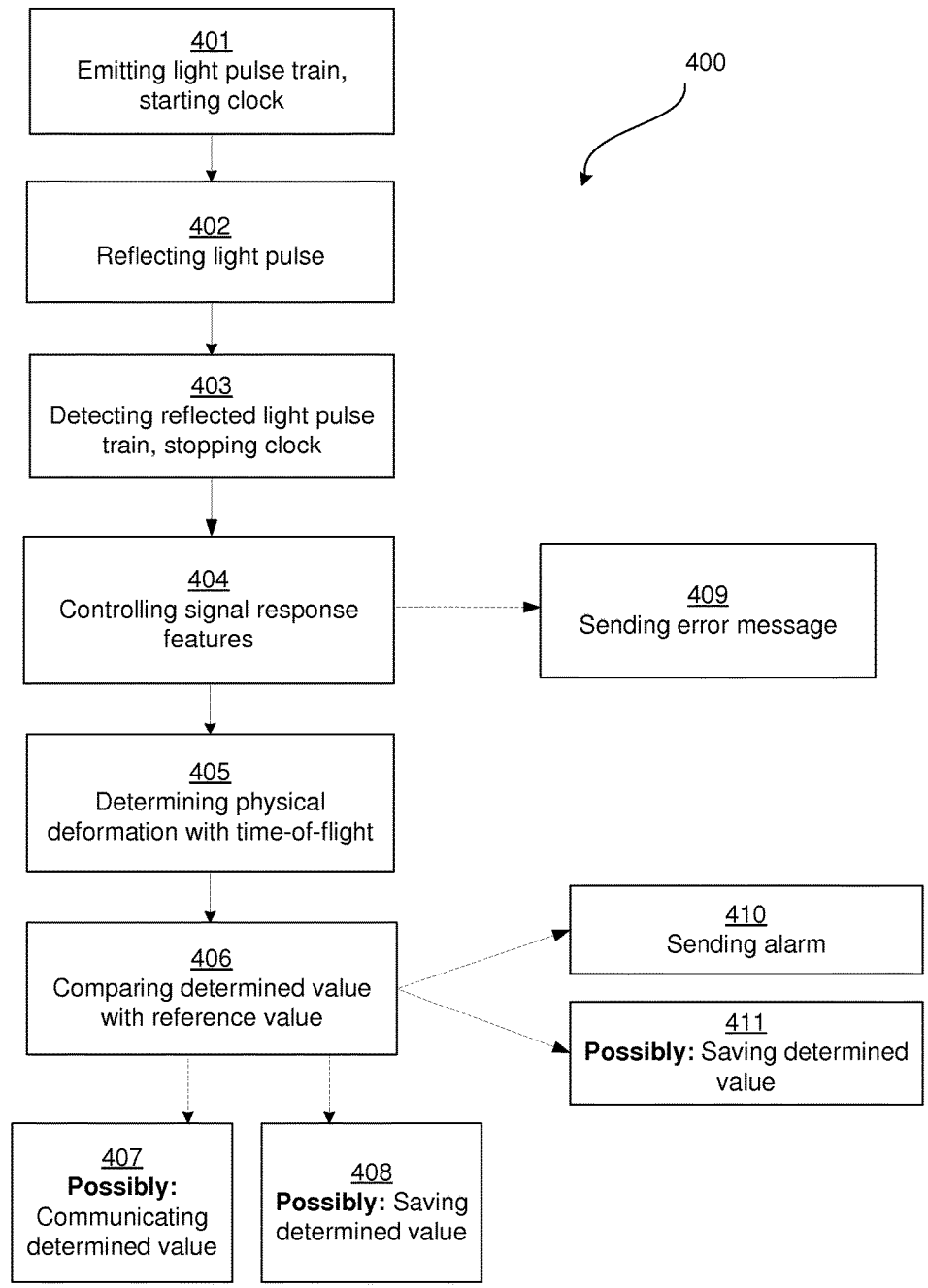
FIG. 4 shows a flowchart of the strain determination procedure according to the time-of-flight method.

FIG. 4 shows a flowchart in which a method 400 of the measurement according to the time-of-flight method is described with reference to a bolt 1 of the type referred to above.

The first step 401 is that the control unit 6 controls the light emitter to emit a light pulse train into the cavity 4 of the mechanical member 1, and at the same time, the control unit 6 initiates a time measurement by starting a clock at the time T1. The emitted light pulse train travels through the cavity 4, and in step 402 it reaches the bottom where it is reflected. From there the light pulse train starts to travel back through the cavity 4 towards the detector. In step 403 the reflected pulse train is detected by the detector and the time measurement is terminated at the time T2.

In step 404 the control unit 6 analyses the pulse train's signal response features, that is for example signal strength, amplitude and pulse shape. Step 409 describes the case in which no pulse train is detected within a certain amount of time, or if the detected signal is disturbed in some way. The control unit 6 then controls an error message. This could be done via the communication unit 10 or for example by visible means, for example by a diode (not shown) changing colour from green to red. If, on the other hand, the detected pulse is OK, which is described in step 405, the control unit 6 determines the time it took for the pulse to travel from the top of the cavity 4, to the bottom and back to the top again, by T2-T1. It then uses this time and the method time-of-flight to determine physical deformation, in this case strain data or elongation, of the bolt.

In step 406 the control unit 6 compares the determined strain data, or elongation, with a reference value. If the strain data is within a preset acceptable range, the control unit 6 could either control the communication unit 10 to send the determined value to an external unit 13, 14, for example a computer, and/or it could power a green diode, step 407, or it could also store the determined strain data in the memory unit 7, step 408. It could in some embodiments perform both step 407 and step 408.

In step 410 the determined strain data is not within the preset acceptable range, and the control unit 6 transmits some kind of alert regarding insufficient strain. This could for example be done by an error message to an external unit 13, 14, like a computer, or by lighting a red diode. The control unit 6 could also, step 411, store the determined strain data in the memory unit 7. It could in some embodiments perform both step 410 and step 411.

Figure 5:
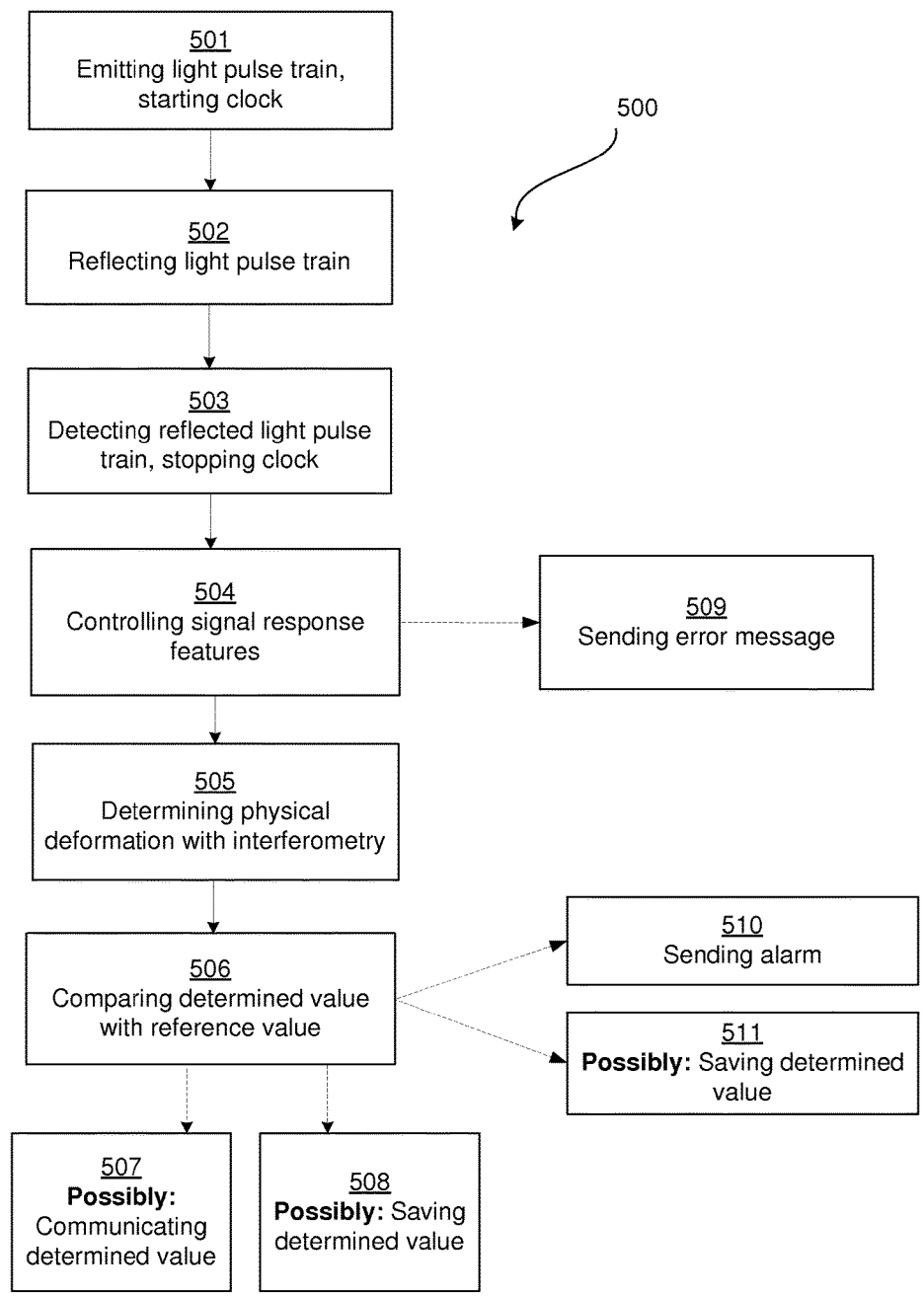
FIG. 5 shows a flowchart of the strain determination procedure according to interferometry.

FIG. 5 shows a flowchart in which a method 500 of the measurement according to the interferometry method is described with reference to a bolt 1 of the type referred to above.

The first step 501 is that the control unit controls the light emitter to emit a light pulse train into the cavity 4 of the mechanical member 1, and at the same time, the control unit 6 initiates a time measurement by starting a clock at the time T1. The emitted light pulse train travels through the cavity 4, and in step 502 it reaches the bottom where it is reflected. From there the light pulse train starts to travel back through the cavity 4 towards the detector. In step 503 the reflected pulse train is detected by the detector and the time measurement is terminated at the time T2.

In step 504 the control unit 6 analyses the pulse's signal response features, that is for example interference pattern, signal strength, amplitude and pulse shape. Step 509 describes the case in which no reflected pulse train is detected within a certain amount of time, or if the detected signal is disturbed in some way. The control unit 6 then controls an error message. This could be done via the communication unit 10 or for example by visible means, for example by a diode (not shown) changing colour from green to red. If, on the other hand, the detected pulse train is OK, which is described in step 505, the control unit 6 analyses the interference pattern. It then uses interferometry to determine physical deformation, in this case strain or elongation, of the bolt.

In step 506 the control unit compares the determined strain data with a reference value. If the strain data is within a preset acceptable range, the control unit 6 could either control the communication unit 10 to send the determined value to an external unit 13, 14, for example a computer, and/or it could light a green diode, step 507, or it could also store the determined strain data in the memory unit 7, step 508. It could in some embodiments perform both step 507 and step 508.

In step 510 the determined strain data or elongation is not within the preset acceptable range, and the control unit 6 controls some kind of alert regarding insufficient strain. This could for example be done by an error message to an external unit 13, 14, like a computer, or by lighting a red diode. The control unit 6 could also, step 511, store the determined strain data in the memory unit 7. It could in some embodiments perform both step 510 and step 511.

Figure 6:
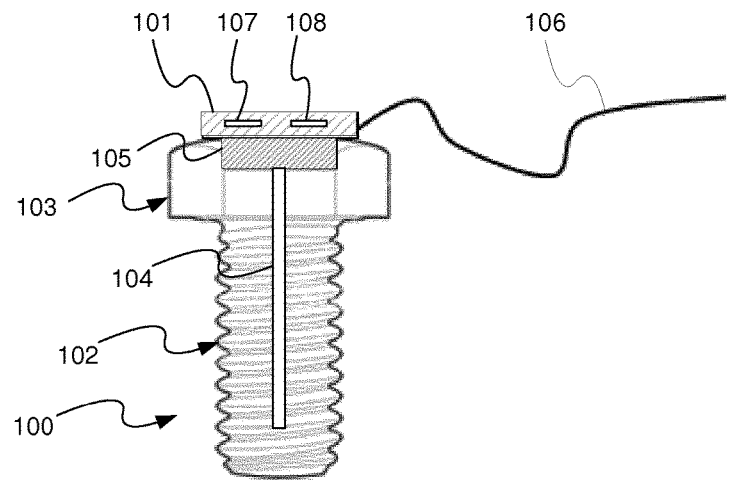
FIG. 6 shows a bolt according to an alternative embodiment.

In FIG. 6 there is shown a subsurface application of the bolt 100 developed for underwater use. This bolt 100 comprises a head 103 and a shaft 102 with an elongate bore or cavity 104 extending from the head 103 of the bolt into the shaft 102. The bolt 100 is provided with an electronics package 105 comprising basically the same components as the previously described bolt 1, and the same features as this bolt, but, it is further equipped with a cap or package 101 on the head of the bolt 100. Inside the cap package 101 there is provided a receiver 107 for reception of radio signals. The signals may come from a Bluetooth® transmitter, possibly a low energy Bluetooth® transmitter (not shown), or any other suitable transmitter provided in the electronics package 105. The cap package 101 is further equipped with a coil 108 for contact free inductive energy transmission to the electronics package 105. The bolt 100 is provided with wire 106 connected to either another bolt or directly to an external data collecting device.

The electronic package 105 and the cap package 101 have thus no direct contact with each other, no galvanic contact, but communication and power transmission between the two are still accomplished. The electronics unit 105 is sealed within the head 103 of the bolt 100 and is thus protected from outer elements. The bolt 100 is therefore adapted for use deep under water; it persists several thousand meters below the surface. This is very useful in e.g. offshore industries.

Figure 7:
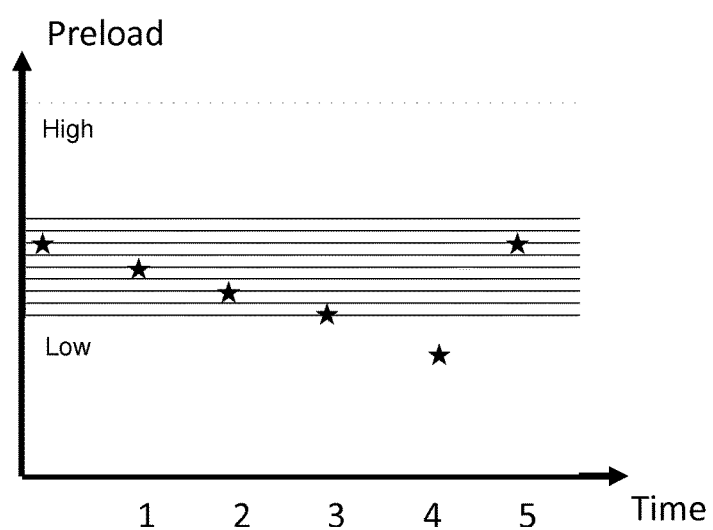
FIG. 7 shows a graph of measured strain data.

An example of a graphical presentation of measured values is shown in FIG. 7. When a controller or inspector uses a handheld device for checking the strain data of a bolt he/she may get this graphical presentation on the display. It may in another embodiment be shown on a display of an external device, either when a measurement value is asked for, on with regular intervals.

The graph shows preload on the y-axis and time on the x-axis. In a real application the units on the axis will be customized for the current application. Both preload and time will be expressed in appropriate units respectively. The graph comprises three fields, representing high, low and acceptable preload. All measurement values, represented as stars, are desired to be within the acceptable range. If a value ends up in the low range field the bolt may be loosening. If a value ends up in the high range area the bolt may be damaged due to too much preload and in the worst case break in two.

When a measurement is done, i.e. the controller reads the strain value from a bolt, a marking is shown in the graph, here in the form of a star. Next time a value for the same bolt is measured a new marking is shown in the graph. The example graph in the figure shows thus six measurement values for one specific bolt. The first four values, as well as the last one, shown in the example are ok; they are well within the acceptable range. The fourth value on the other hand is on the border of being too low, and the fifth is definitely too low. This is a helpful tool for the controller; he/she can see how the preload changes over time and even foresee when a bolt needs to be tightened. The collected preload data may also be processed by the external device and a time when the preload will be close to the low range can be calculated and foreseen, e.g. by extrapolation of the measured values. To further help the inspector values outside the acceptable range may be colour coded, e.g. markings in red if the value is too low.

It is appreciated that the inventive concept is not limited to the embodiments described above, and many modifications are feasible within the scope of the invention set forth in the appended claims. As understood from the description, the inventive system is not applicable only to fastening means but also to other mechanical members, such as threaded fasteners, for instance screws, bolts, stud bolts, specially formed male threaded fasteners or threaded rods. The techniques of determining strain of a mechanical member described above is applicable to many various fields with demands of high security, for example within the oil-, nuclear power-, wind power-, aircraft-, automotive-, process- or mining industries, but also within fields like measurement technology and vibration measurements.

The invention claimed is:

1. A mechanical member having a portion which is deformed when subjected to strain and comprising a cavity, wherein said member further comprises an optical unit configured to emit light into said cavity and to detect reflected light;

a control unit connected to the optical unit and configured to determine signal response features caused by the emitted light travelling from the optical unit into the cavity, being reflected, and travelling back to the optical unit, wherein the control unit is further configured to determine physical deformation of the portion of the mechanical member from the signal response features to determine strain data from the physical deformation; and a communication unit connected to the control unit and configured to communicate strain data of the mechanical member to an external device; and wherein said member is included in a network which also comprises central software configured to monitor said strain data of all members comprised in the network and to automatically report normal function, malfunction or deviations.

2. The mechanical member as claimed in claim 1, wherein the control unit is configured to determine physical deformation by the time-of-flight method or by interferometry.

3. The mechanical member as claimed in claim 1, wherein said optical unit comprises a light emitter and a light detector; and said control unit comprises a microcontroller configured to control the light emitter.

4. The mechanical member as claimed in claim 1, wherein said optical unit comprises a laser.

5. The mechanical member as claimed in claim 1, further comprising a charging unit configured to harvest energy from the surrounding environment.

6. The mechanical member as claimed in claim 5, further comprising an energy storing unit configured to store energy harvested by said charging unit, and to provide energy to said control unit and said communication unit.

7. The mechanical member as claimed in claim 1, further comprising a memory unit configured to store pre-set fabrication data and said strain data.

8. The mechanical member as claimed in claim 1, wherein said communication unit is wireless.

9. The mechanical member as claimed in claim 1, wherein said member is configured to communicate with other corresponding members comprised in the network.

10. The mechanical member as claimed in claim 1, wherein said member is a fastening element, such as a bolt, a screw or a rivet configured to tighten two parts together.

11. The mechanical member as claimed in claim 1, wherein said cavity is an elongate bore in said member.

12. The mechanical member as claimed in claim 1, wherein said cavity contains an optical fiber.

13. A method for measuring strain of a mechanical member having a cavity; comprising the steps of:
emitting a light pulse train from an optical unit into the cavity;
detecting a reflected light pulse train by the optical unit;
determining signal response features caused by the emitted light travelling from the optical unit into the cavity, being reflected, and travelling back to the optical unit, and
determining physical deformation of the mechanical member from the determined signal response features, to determine strain data from the physical deformation;
communicating strain data to an external device; and
with central software, within a network including the mechanical member, monitoring the strain data of all members comprised in the network and automatically reporting normal function, malfunction or deviations.

14. The method as claimed in claim 13, wherein said physical deformation is determined by a time-of-flight method or interferometry.

15. The method as claimed in claim 13, wherein said strain data are communicated in a network of mechanical members.

16. A system comprising:
a number of mechanical member each having a portion which is deformed when subjected to strain and comprising a cavity, wherein said members further comprise an optical unit configured to emit light into said cavity and to detect reflected light;
a control unit connected to the optical unit and configured to determine signal response features caused by the emitted light travelling from the optical unit into the cavity, being reflected, and travelling back to the optical unit, wherein the control unit is further configured to determine physical deformation of the portion of the mechanical member from the signal response features to determine strain data from the physical deformation;
a communication unit connected to the control unit and configured to communicate strain data of the mechanical member to an external device; and
central software and infrastructure configured to monitor said strain data of all members comprised in the system, and automatically report normal function, malfunction or deviations.

17. The system as claimed in claim 16, wherein information is read from and written to the mechanical members.

18. A structural element, comprising:
a number of mechanical members each having a portion which is deformed when subjected to strain and comprising a cavity, wherein said members further comprise an optical unit configured to emit light into said cavity and to detect reflected light; and
central software and infrastructure configured:
to monitor strain data determined from physical deformation of all members comprised in the structural element as determined from the reflected light; and
to automatically report normal function, malfunction or deviations.

19. The structural element as claimed in claim 18, wherein said mechanical members are connected in a network.

* * * * *